May 6, 1952  J. W. ANDERSON  2,596,063
WINDSHIELD WIPER BLADE LINKAGE ASSEMBLY
Filed Dec. 13, 1945  2 SHEETS—SHEET 1
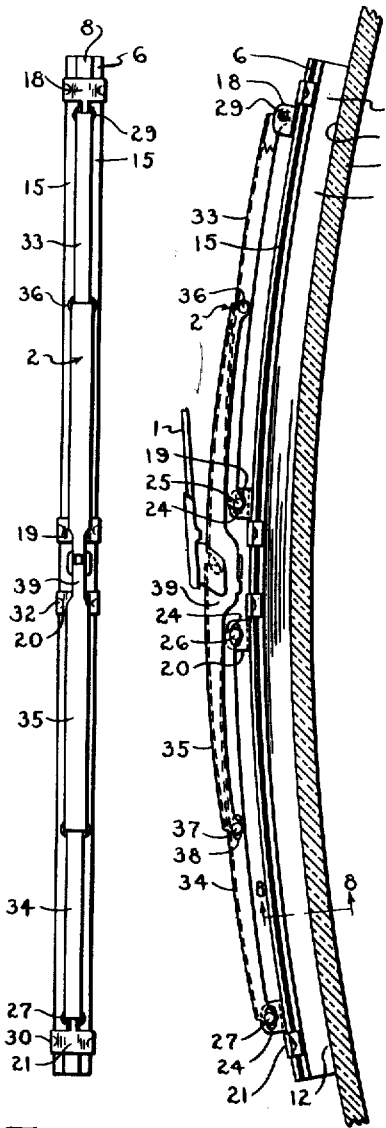
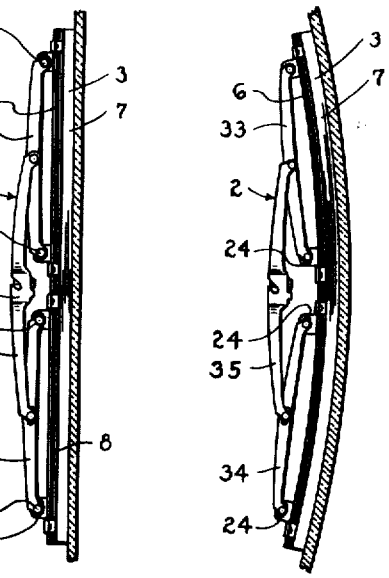
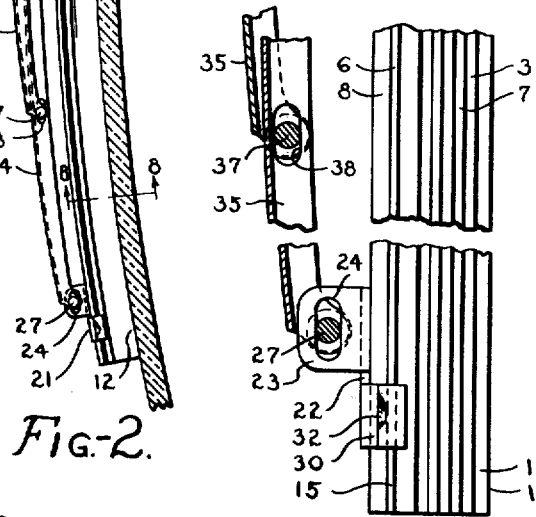
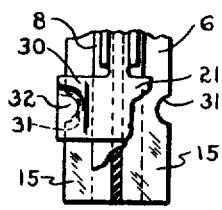
FIG.-1.  FIG.-2.  FIG.-3.  FIG.-4.
FIG.-5.  FIG.-6.
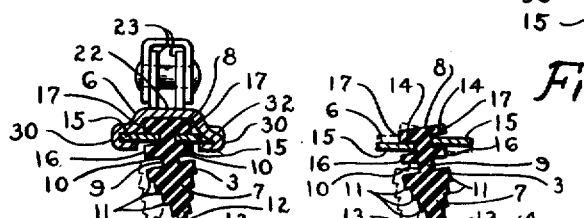
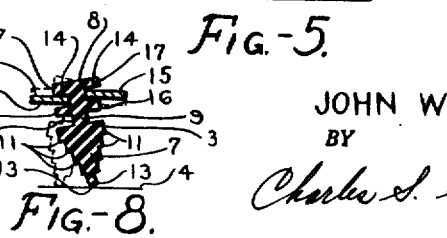
FIG.-7.  FIG.-8.
INVENTOR.
JOHN W. ANDERSON
BY
Charles S. Penfold
ATTORNEY INVENTOR.
JOHN W. ANDERSON
BY
Charles S. Penfold
ATTORNEY

Patented May 6, 1952

2,596,063

UNITED STATES PATENT OFFICE 2,596,063

WINDSHIELD WIPER BLADE LINKAGE ASSEMBLY

John W. Anderson, Gary, Ind., assignor to Productive Inventions, Inc., a corporation of Indiana Application December 13, 1945, Serial No. 634,730

31 Claims. (Cl. 15—245)

This invention relates generally to windshield or window cleaners or wiper devices and more particularly is directed to a device adapted to clean or wipe a curved surface as well as a substantially planar surface.

Heretofore, engineers for the automotive industry have been handicapped or placed at a disadvantage in designing and constructing a curved windshield assembly or unit for a modern streamlined automobile, for the reason that no cleaner or wiper device had been devised for satisfactorily cleaning the curved glass of a windshield. This inability to properly clean such surfaces has been a serious problem confronting these engineers for a long period of time.

The primary object of the present invention is to provide a cleaning device embodying improved principles of design and construction which solves the above problem; thereby opening up an undeveloped field of windshield construction and body design for automotive manufacturers which should result in improving the vision and reducing driving hazards of the car owner, and in the additional streamlining of car bodies for greater efficiency and economy of operation.

An important object of the invention is to provide a wiper assembly which is adapted for connection to any of the standard arms now in use. In other words, the present invention makes it possible to use a conventional single pivot driving mechanism which projects the blade through a definite arc of a circle.

An additional object of the invention is to provide a wiper assembly in which the wiper means and a holder or mounting means therefor are so constructed and arranged that they may flex or yield in a plane generally transverse to the longitudinal axis of the assembly while traveling over a convex or concave surface, or combinations of such surfaces.

Another object of the invention is to provide an improved holder or mounting means, preferably comprised of a plurality of flexible members or portions which are assembled with the wiper means in a unique manner or method, and means for fastening the members together to hold the parts in assembly.

A further object of the invention is to properly locate the fastening means above referred to; to provide a plurality of links on members connecting the fastening means together; and to provide bridge means connecting the links or members together in a manner whereby to obtain the desired linkage to enable the wiper means and mounting to operate as comprehended by the invention.

A still further object of the invention is to provide a holder or mounting for the wiper means of such a character that at least one member or portion thereof may flex or yield with respect to another member or portion thereof whereby to assist in compensating for the variations in contour of the surface to be cleaned.

Another important object of the invention is to provide a flexible or yieldable holder or mounting for cleaner means and improved means for connecting the holder to the windshield wiper arm.

A particular object of the invention is to provide a windshield wiper assembly which is comprised of parts few in number and durable in character which can be economically manufactured and assembled on a production basis.

Other objects and advantages of the invention will become evident after considering the description hereinafter set forth in conjunction with the drawing annexed hereto.

In the drawing:

Figure 1 is a front view in elevation of the cleaner assembly;

Figure 2 is a side view in elevation of the assembly illustrated in Figure 1 applied to the convex surface of a windshield;

Figures 3 and 4 illustrate side views of the assembly as applied to planar and concave surfaces, respectively, of a windshield;

Figure 5 is an enlarged view of a part of the lower section of the assembly illustrated in Figure 2 showing the preferred way in which link means and bridge means are operatively connected to each other and to the fastening means;

Figure 6 illustrates at least one way in which the fastening means may be secured to the holder or mounting;

Figure 7 is an end view of the assembly illustrated in Figure 2, with a portion thereof shown in section to illustrate a detail of construction;

Figure 8 is a transverse section taken substantially on line 8—8 of Figure 2;

Figures 9, 10, 11:
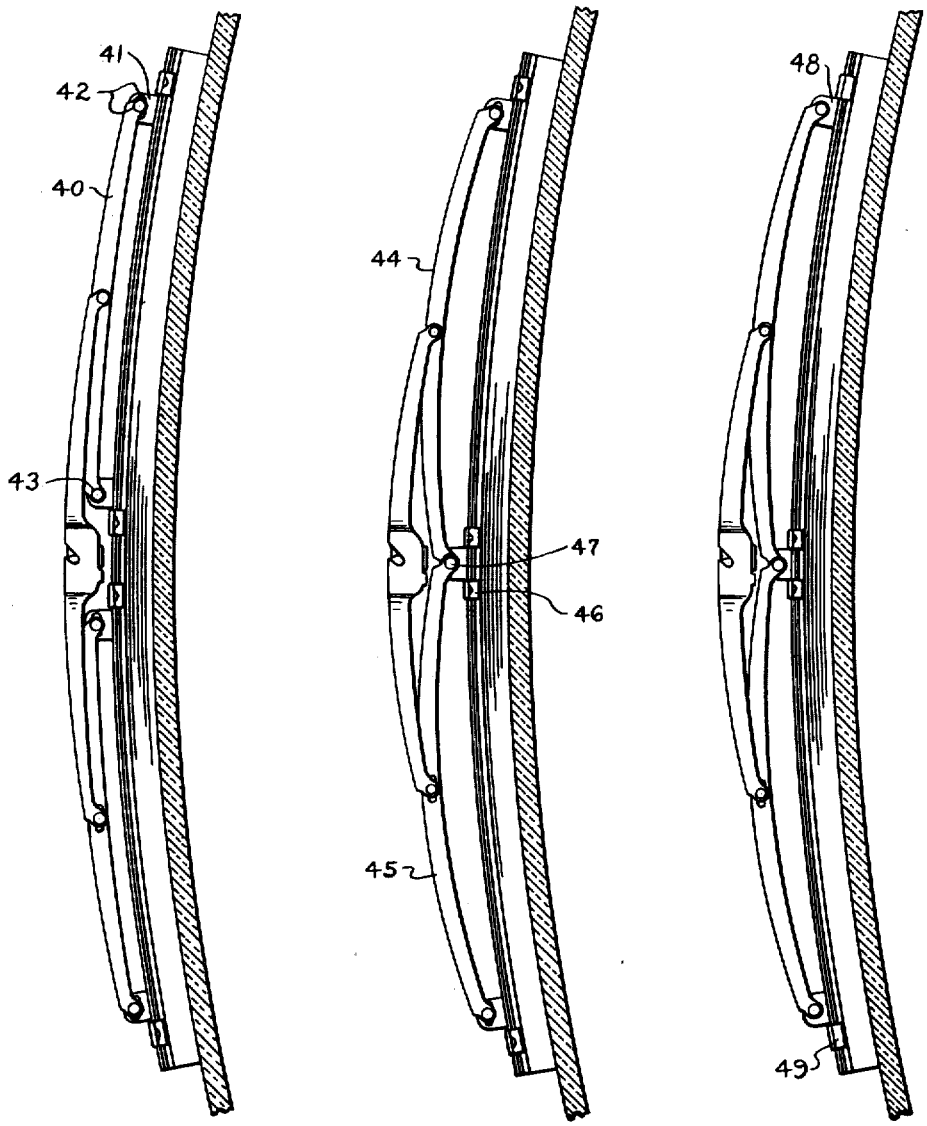
Figure 9 is a side view in elevation of a modified form of a cleaner assembly, similar to the assembly illustrated in Figures 1 through 8 of the drawing, depicting a different mode of obtaining a lost-motion connection between certain parts of the linkage assembly.
Figure 10 illustrates a cleaner assembly embodying a different arrangement or hook-up between the link members and fastening means.
Figure 11 is an assembly similar to that illustrated in Figure 10 showing a different way to obtain a lost-motion connection.

Referring to Figure 2 of the drawing, numeral 1 designates a section of a conventional wiper arm supporting a wiper assembly generally designated 2 in a manner to press the wiper means 3 against the convex surface 4 of a windshield glass 5. The wiper means 3 is secured to a holder or mounting means 6. The wiper means and the holder 6 are preferably constructed to normally assume a straight condition.

More specifically, the wiper means 3 is constructed of some desirable resilient material, such as rubber, and preferably includes a wiper head 7, generally triangular in cross-section, and a part 8 generally rectangular in cross-section, which are integrally and pivotally joined together by a reduced or neck portion 9. Stated otherwise, the sides of the wiper means are interrupted by a pair of oppositely disposed longitudinally extending corresponding recesses 10 to provide pivotally connected parts or portions. The reduced portion 9 permits the wiper head 7 to pivot with respect to the part 8 adjacent the termination of each stroke of the wiper means as it travels back and forth over the windshield glass.

The triangular wiper head 7 is preferably provided with a plurality of wiping edges or arrises 11 and a lip 12 having wiping edges 13. The wiping edges 13 are adapted to alternately normally engage the glass and certain of the auxiliary wiping edges 11 may also be caused to engage and clear the glass depending on the pressure applied to the wiper means. It is to be understood that the wiping portion may be constructed otherwise than illustrated. For example, the head may be entirely eliminated in which event the neck portion 9 would be of a desirable size and provided with wiping edges corresponding to the edges 13 whereby to accomplish the results comprehended by the invention. Furthermore, the wiper means may be comprised of a plurality of plies or laminations of rubber or the equivalent, which may be bonded or otherwise secured to a flexible holder or backing.

Figure 12:
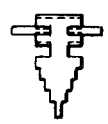
Figure 12 illustrates a modified mode of assembling the wiper means and holder means together.

The wiper means and holder means are preferably connected together by an interlocking arrangement. As clearly illustrated, the marginal side walls of the wiper part 8 are interrupted by a pair of oppositely disposed longitudinally extending corresponding openings or grooves 14 which receive a pair of corresponding flexible portions or strips 15 constituting the holder means or mounting 6. These strips are preferably constructed from relatively thin resilient sheet metal stock, but may be made from any material suitable for the purpose. In certain applications, it may be considered advantageous to construct the holder or mounting means in one piece. The wiper and holder may be assembled as desired but the preferred method is to simultaneously insert the strips 15 into the grooves 14. The reduced portion, or neck between the grooves or interruptions 14 is thus disposed in the space or opening between the strip portions. Although not essential, the preferred arrangement is to permit the strips to substantially simultaneously move in opposite directions in the same plane as the wiper assembly begins or starts each stroke, as illustrated in Figure 8, whereby to improve the wiping action. After these parts have been thus positioned, the strips 15 are then preferably permanently secured together in spaced apart parallel relation by a pair of fastening means 18 and 19 preferably disposed adjacent one side of the mid-point of the assembly and by another pair of fastening means 20 and 21 adjacent the other side of the mid-point. If found desirable, the strip portions may be secured to the wiper means by forcibly inserting the portions into grooves of the character depicted in Figure 12.

The fastening means, except for one detail as 18, are substantially identical in character and accordingly a description of one is deemed sufficient. Each fastening means preferably includes an elongated generally planar base portion 22 which overlies and may bear against the planar top wall of the part 8. One extremity of this base portion 22 is provided with a pair of outstanding parallel standards 23. Each standard, except 18, is provided with a slot 24. The ends of pivot pins or pintles 25, 26, and 27 project through the slots in the standards of fastening means 19, 20, and 21, respectively, for pivotal and slidable movement whereby to assist in providing compensation for the flexation or yieldability of the holder means and wiper means when the latter rides or travels over a curved or undulated surface. The standards of the fastening means 18 are preferably provided with round holes 28 which receive the ends of a pivot pin or pintle 29. In other words, a lost-motion connection is provided, and which may be applied to three or all of the fastening means as will be subsequently described. The other extremity of the base portion 22 is preferably provided with a pair of corresponding offset ears or finger portions 30. These ears extend in a direction opposite to that of the standards and are clamped down against the strips 15 as clearly illustrated in Figure 7.

In order to prevent any possible longitudinal movement or displacement between the strips 15, the exterior marginal edge adjacent the extremity of each strip is preferably provided with an interruption or circular cutout 31 so that a portion 32 of each ear may be indented or pressed into the interruption or cutout. Slippage or longitudinal movement of the wiper means and holder with respect to each other is preferably prevented by providing close fits and by causing the base portion 22 to bear lightly against the top surface of part 8 as depicted in Figure 7. Ease and speed of assembly can be promoted by providing a pair of oppositely disposed interruptions adjacent the extremities of each strip, in lieu of the ones illustrated. Counteraction to such movement may also be obtained by providing stops or abutments adjacent the ends of the holder.

It is to be understood that any fastening means suitable for the purpose may be employed and that they may be secured to the holder or mounting means in modes different from the one just described.

As alluded to above, a pair of fastening means 18 and 19 and a pair of fastening means 20 and 21 are preferably disposed on opposite sides of the mid-point of the wiper assembly. Although not essential, it is desirable that the outermost fastering means 18 and 21 be located relatively near the extremities of the wiper assembly and that the fastening means 19 and 20 be interposed therebetween at appropriate locations in order to obtain a well-balanced assembly whereby all points or portions of the wiping edges of the wiper means intimately or properly engage the surface to be cleaned, whether the surface is concave, convex, substantially planar, or combinations of such surfaces. In order to assist in achieving the results comprehended by the invention, the extremities of a link 33 are pivotally connected to the pivot pins 25 and 29 of the fastening means 18 and 19, respectively; the extremities of a link 34 are pivotally connected to the pivot pins 26 and 27 associated with the fastening means 20 and 21, respectively; and the link members 33 and 34 are in turn connected together by bridge means 35. One extremity of the bridge means 35 is preferably pivotally connected to the mid-point of the link 33 by a pivot 36 and its opposite extremity is preferably pivotally and slidably connected with respect to the mid-point of the link 34 by means of a pin 37 movable in slots 38 provided in the link. The bridge means is provided with means 39 whereby to detachably connect the wiper assembly 2 with respect to the free end of the wiper arm 1 and as depicted includes a housing portion provided with an opening for the reception of a part carried by the arm unit and a locking element for holding the part in such opening. Thus, it will be evident that that portion of the cleaner assembly intermediate the fastening means 18 and 19 including the link 33 may constitute one cleaner section or portion, and that the other half of the assembly another cleaner section or portion, which are operatively connected together by the intermediate portions of the holder and cleaner means. As clearly exemplified, the links 33 and 34 and the bridge means 35 are preferably made slightly arcuate in shape in order to provide sufficient clearances for outward flexation or bending of those portions of the holder or mounting means intermediate respective pairs of the fastening means when the wiper assembly is applied to a convex surface. Attention is also directed to the fact that the links and bridge means are preferably channel-shape in form so that the links may receive the standards 23 of the fastening means and the bridge means may receive the innter extremities or portions of links. Sufficient bearing or abutting surfaces are provided between the fastening means, the links, and the bridge means to insure a good stabilized assembly and yet permit sufficient movement between the parts whereby to assist the wiping head of the wiper or cleaner means to vacillate or pivot as it begins each stroke.

Under most conditions, the "slop" or play necessary to permit pivots 26 and 27 to avoid cramping or restricting the movement of the wiper element as it bends to conform to the glass, may be obtained by making such pivots substantially smaller in diameter than the diameter of the holes.

The means 39 is preferably located in such a position that it does not interfere with the disposition of the innermost fastening means 19 and 20. This is an advantage because it places the point of connection to the wiper arm relatively close to the holder and at the same time decreases the overall width of the cleaner assembly. In order to allow the wiper means and holder therefor to simultaneously flex or yield, it is necessary to provide a lost-motion connection means and this is accomplished by the pin and slot connections alluded to.

If found desirable, the assembly may be modified by connecting the outermost extremity of a link 40 to fastening means 41 by a pin and slot connection 42 and the innermost extremity of the link 40 to a fastening means by a pivot 43 as exemplified in Figure 9, in lieu of the connection arrangement illustrated in Figure 2. Obviously, both extremities of the bridge means may be connected to the links by pin and slot connections.

Referring to the modification of the invention illustrated in Figure 10 of the drawing, it will be evident that the innermost extremities of a pair of links 44 and 45 are pivotally connected to a single centrally disposed fastening means 46 by a pivot 47. This arrangement may be found to be desirable when the assembly is designed for application to a curved surface having a shorter radius. It will be noted that this modified assembly is provided with suitable lost-motion connection means. Since the fastening means 46 is preferably centrally disposed, it is of course desirable that the bridge means be appreciably arched or bowed as depicted.

The modified embodiment of the invention illustrated in Figure 11 substantially corresponds to the one illustrated in Figure 10 except that the lost-motion is established or effected between the outermost fastening means 48 and 49 and holder allowing the fastening means to longitudinally slide with respect to the holder in lieu of the pin and slot arrangement exemplified in Figures 9 and 10.

The operation of the cleaner is preferably such that when the wiper means is traveling to the left to clean a surface as depicted in Figures 7 and 8, the right and left-hand strips or portions 15 of the holder will be caused to assume outwardly and inwardly disposed positions with respect to the surface, respectively; and when traveling to the right, the wiper head 7 will vacillate or pivot to an opposite angular position assisting to cause the right-hand and left-hand strips or portions to assume opposite positions as indicated by the dotted lines. More specifically, when the wiper means is positioned as depicted in Figure 7, the right-hand portion 16 and left-hand portion 17 of the part 8 will be pressed against the lower and upper surfaces of the respective strips or portions, and the other portions 16 and 17 of the part may partially become disengaged from the opposite surfaces of the strips, respectively. There will, of course, be a reversal in the movement of the portions 16 and 17 when the wiper means is traveling in a direction opposite to that just stated.

It is important to note that the provision of the reduced or neck portion 9 connecting the head 7 and part 8 together and the neck portion between the grooves 14 of part 7 improves the resiliency or flexibility of the wiper means in general and consequently results in better vacillation or pivoting of the wiper head to promote and obtain a superior wiping action, not heretofore achieved in prior constructions.

Attention is particularly directed to the fact that one or both of the strips or portions of the holder may bend or flex substantially throughout their entire lengths when applied to either of the curved surfaces exemplified in Figures 1 and 3, or to combinations of such surfaces, and while the holder is in such a flexed state or condition, the portions may be caused to alternately move outwardly and inwardly with respect to the surface to be cleaned as the wiper assembly is directed back and forth over said surface or surfaces. Otherwise expressed, at least one portion of the holder or mounting means is so constructed and arranged that it has a plurality of ranges of movement in the same general plane, which plane is substantially transverse to the surface to be cleaned. More specifically, the range of movement of portions 15 as illustrated in Figure 7 is considerably less than the larger range of movement of the wiper assembly as illustrated in Figures 1 and 3. As stated above, the portions 15 are adapted to simultaneously move in opposite directions in a limited plane as the movement of the cleaner or wiper assembly is reversed and begins or starts each stroke; the larger range of movement being primarily influenced by the curvature or contour of the windshield surface.

The wiper assembly, during its operation, is subjected to torsional strains and stresses which may result in causing at least one of the strips or portions to slightly tilt or tend to twist and this fact may also contribute to obtaining an improved cleaning action. In any event, the arrangement is such that the holder or mounting means or the cleaner or wiper means will function to maintain the full length of the cleaner portion or wiping edge of the head in proper wiping contact or engagement with the surface to be cleaned, and such an arrangement requires that the holder means be yieldable, yet sufficiently rigid to obtain the results comprehended by the invention. These factors are important in order that the wiper means may automatically adjust itself to the contour of substantially any windshield surface that might be employed to advantage in the automotive industry.

Attention is also directed to the fact that the degree of curvature of the windshield and the length of the wiping element must both be considered in determining the arrangement and construction of the complete wiper blade assembly as herein described. The thickness of members 15 determines the pressures necessary to apply to hold the blades in substantial conformity with the curved glass. Since available wiper arm pressures are limited in value, it is desirable to reduce the thickness of members 15. However, when that thickness is reduced beyond a certain determinable point, the assembly lacks stability, the wiping element tends to chatter as it moves across the glass and there is not maintained as in the areas midway between pivots 26 and 27, for example, to provide an adequate "hugging" of the glass.

As the length of the blade is increased, a point is reached where a thickness in elements 15 adequate to provide proper "hugging" of the glass throughout the entire length of the squeegee produces a resistance to flexing requiring more pressure than is available with the conventional type of commercial windshield wiper arms. This problem threatened to seriously limit the lengths in which blades constructed similarly to those shown in my copending application, Serial No. 634,729 could be effectively applied. The present invention, however, reduces the span between pivotal points such as 26 and 27 and thereby brings within practical limits the problem of reconciling the resistance of members 15 to flexing with available arm pressures while at the same time maintaining pressures against the windshield throughout the entire length of the wiper element.

The constructional characteristics of each of the two longitudinal halves of the subject invention as shown in Figure 2, for example, are substantially to those of the assembly shown in Figure 1 of the copending application above mentioned. Unlike the rigid halves or sections of other practiced structures, however, the subject invention may be constructed and arranged, as to dimensional details, to provide substantially uniform pressure throughout the entire length of the wiping element while at the same time permitting that element and its supporting structure to flex desirably. As an example of the adaptability of the subject invention to the object of providing such uniform pressure, it has been found desirable under some conditions to apply the pivotal pressure, as by pivot 37, closer to the terminal pivot 26 than to terminal pivot 27.

Accordingly, it will be evident that the preferred form of the invention includes improved cleaner or wiper means and holder or mounting means which are associated or connected together in a manner whereby they may flex or yield while traveling over and cleaning or wiping a concave or convex surface as illustrated in Figures 2, 4, and 9 through 11, of the drawing, or combinations of such surfaces, as well as for superior wiping operation against a substantially planar surface as illustrated in Figure 3.

It will also be manifest that the improved cleaner assembly in effect embodies the provision of a plurality of cleaner or wiper sections or portions which are operatively connected or joined together by a resilient or flexible holder or mounting means.

Moreover, it is apparent that unique means have been provided whereby to improve or promote the resiliency or yieldability of the cleaner means whereby to obtain an improved cleaning or wiping action, and a plurality of different improved means for connecting a holder or mounting means with respect to bridge means whereby to assist in compensating for the flexation or yieldability of the mounting means and the wiper means.

Having thus described my invention, it is obvious that various modifications may be made in the same without departing from the spirit of the invention; and, therefore, I do not wish to be understood as limiting myself to the exact forms, constructions, arrangements, and combinations of parts herein shown and described and defined in the claims.

I claim:

1. A wiper for cleaning a curved surface, comprising a blade flexible for conforming to the surface curvature, a primary yoke having an arm attaching part, and secondary yokes each connected intermediate its ends to an end of the primary yoke and having its opposite ends flexibly connected to the blade, such blade having a flexible backing strip to which the opposite ends of the secondary yokes are connected.

2. A windshield cleaner comprising a flexible squeegee unit substantially uniformly flexible throughout its length and conformable to the surface being wiped, a pressure distributing holder having relatively movable parts engaged with the squeegee unit for distributing an arm applied pressure to said unit, said holder comprising a pair of yokes movably mounted intermediate their ends on a pressure-applying means and having their opposite ends individually connected to the squeegee unit only at points spaced longitudinally along the unit for conforming the latter to the surface being wiped.

3. A windshield cleaner comprising a flexible squeegee unit substantially uniformly flexible throughout its length and conformable to the surface being wiped, a pressure distributing holder having relatively movable parts engaged with the squeegee unit for distributing an arm applied pressure to said unit, said holder comprising a primary yoke and plural secondary yokes pivotally mounted on the opposite ends of the primary yoke, and means connecting the outer ends only of the secondary yokes to the squeegee unit.

4. A windshield cleaner comprising a flexible squeegee unit substantially uniformly flexible throughout its length and conformable to the surface being wiped, a pressure distributing holder having relatively movable parts engaged with the squeegee unit for distributing an arm applied pressure to said unit, said holder comprising a primary yoke and plural secondary yokes pivotally mounted on the opposite ends of the primary yoke, said secondary yokes being mounted for relative movement, and means connecting spaced portions only of the secondary yokes to the squeegee unit.

5. A windshield cleaner comprising a holder unit consisting of a primary yoke and plural secondary yokes movably connected thereto, and a squeegee unit substantially uniformly and freely flexible throughout its length and connected only at longitudinally spaced points to the secondary yokes.

6. A wiper for cleaning a curved surface, comprising an elongated blade flexible for conforming to the surface curvature, the blade having an elongated flexible backing strip, a primary yoke extending lengthwise of the strip and having an arm attaching portion, and secondary yokes, one secondary yoke connected intermediate its ends to an end of the primary yoke and having its opposite ends connected to the backing strip at longitudinally spaced points, and another secondary yoke connected intermediate its ends to the opposite end of the primary yoke and having its opposite ends connected to the backing strip at longitudinally spaced points.

7. A wiper blade for cleaning a surface, comprising an elongated element flexible for conforming to such surface and an elongated flexible support for such element, a primary yoke extending lengthwise of the blade and having an arm attaching portion, and secondary yokes, one secondary yoke being connected intermediate its ends to an end of the primary yoke and having its opposite ends connected to the blade at longitudinally spaced points, and another secondary yoke connected intermediate its ends to the opposite end of the primary yoke and having its opposite ends connected to the blade only at longitudinally spaced points.

8. A wiper for cleaning a surface, comprising an elongated blade resiliently flexible for conforming to a surface to be cleaned, said blade comprising a flexible wiping element and an elongated resiliently flexible support therefore confining flexure of said blade to a single plane, pressure distributing means having at least three portions relatively moveable in said plane and respectively connected to said blade at points adjacent the ends thereof and one other point intermediate the ends, said pressure distributing means being adapted to receive pressure from a single source and distribute said pressure to said at least three points.

9. A wiper for cleaning a surface, comprising an elongated blade resiliently flexible for conforming to a surface to be cleaned, said blade comprising a flexible wiping element and an elongated support therefore resiliently flexible only in a single plane for confining flexure of said blade to said single plane, a pair of yokes having their ends independently connected to said blade only at longitudinally spaced points, and means for simultaneously transmitting pressure to intermediate portions of both said yokes.

10. A wiper as defined in claim 9 wherein at least one end of each yoke is connected to said blade for limited sliding movement longitudinally thereof.

11. A wiper as defined in claim 9 wherein said yokes are connected to said blade and said last-named means for limited pivotal movement about axes substantially normal to said plane.

12. A wiper assembly for cleaning a surface comprising, a resilient wiper blade and a multi-part pressure distributing unit connected thereto, said wiper blade being freely resiliently flexible throughout substantially its length in a single plane to easily conform to the contour of a surface to be cleaned and lying generally normal to said plane, the parts of said multi-part pressure distributing unit being connected together for relative movement in said plane and having at least three relatively moveable portions connected to said blade at longitudinally spaced points, said unit having means to receive pressure from a single source and being arranged to distribute said pressure to said at least three portions whereby to press on said blade at said longitudinally spaced points to bring said blade into continuous contact with said surface and cause said blade to conform, throughout its operative length, to said surface.

13. A wiper assembly for cleaning a surface comprising, a blade having an elongated flexible wiper, an elongated resiliently flexible backing member connected to said wiper and flexible in unison therewith in a single plane, said backing member being substantially more resistant to flexure than said wiper, and pressure distributing means having at least three portions relatively moveable in said plane and respectively connected to said blade at points adjacent the ends thereof and at one other point intermediate said ends, said pressure distributing means being adapted to receive pressure from a single source and distribute said pressure to said at least three points.

14. A windshield cleaner comprising a primary pressure member provided with means for detachably connecting it to a driving member, supplemental pressure members coactively connected to said primary pressure member to receive pressure therefrom, a longitudinally disposed wiper blade to which said supplemental pressure members are connected at a plurality of spaced apart points thereon, at least one of said pressure points being remote from the extremities of said blade, said wiper blade being uniformly and freely flexible in a single plane and being readily responsive to pressure at said points whereby said wiper blade may be pressed substantially uniformly into continuous contact with progressively varying contours of the surface to be wiped.

15. A windshield cleaner comprising a longitudinally disposed pressure distributing assembly provided with means for receiving pressure from a driving member, a plurality of relatively moveable pressure transmitting members having portions thereof connected to and extending from said pressure receiving means, a longitudinally disposed wiper blade provided with a resilient edge for continuous wiping contact with a surface to be cleaned, said pressure transmitting members being connected to said blade at at least three relatively moveable points longitudinally spaced apart thereon, at least one of said points being remote from the extremities of said blade, said blade being uniformly freely and resiliently flexible in a single plane and being relatively inflexible in a plane transverse to said first-mentioned plane, said pressure receiving means and said pressure transmitting members and said blade being provided, adjacent their respective points of such connection, with abutment means limiting relative lateral tilting movement between said pressure distributing assembly and said blade.

16. In a windshield cleaner, a pressure distributing assembly provided with means for readily removable connection to a driving member, said assembly consisting of a plurality of relatively moveable pressure transmitting parts provided with embracing extremities, said parts having portions thereof connected with said connection means, a wiper blade assembly embodying a longitudinally extending resilient wiping element provided with an edge for continuous contact with the surface to be wiped, a freely and reactively flexible backing member connected to said wiping element longitudinally thereof, said wiper blade assembly being flexible substantially only in a single plane, said backing member having exposed portions, said portions being moveably received at longitudinally spaced apart points by a plurality of said embracing extremities of said pressure transmitting parts whereby to limit lateral movement of said blade assembly while permitting it to flex freely to conform to the surface to be wiped.

17. In a windshield cleaner a pressure distributing assembly comprising a plurality of relatively moveable parts mutually responsive to pressure, a uniformly and resiliently flexible elongated wiper blade assembly connected to said pressure distributing assembly at at least three relatively moveable longitudinally spaced-apart pressure receiving points on said blade assembly, at least one of said points being remote from the extremities of said wiper blade assembly, said parts and said wiper blade assembly being provided, with respect to each other, with abutment means constraining said relative movement substantially to a single plane defined by flexures of said blade assembly as it conforms to varying contours of a surface to be wiped.

18. In combination, a windshield wiper blade subassembly, comprising: a linearly continuous resilient wiping element, and resiliently flexible stay means engaged with and supporting said wiping element throughout substantially the full operative length thereof, said stay means being arranged and constructed to offer throughout its length substantially uniform but little resistance to flexing in a plane substantially perpendicular to a surface to be wiped while remaining substantially inflexible in a plane substantially parallel to said surface; and wiper arm pressure-distributing means connected with said wiper blade subassembly at points spaced longitudinally a substantial distance from each other and from each end thereof for applying pressure thereto in a direction toward a windshield.

19. A surface wiper comprising, a blade having an elongated linearly continuous resilient wiping member capable of flexure to conform to a surface to be wiped and having elongated backing means extending longitudinally of said resilient wiping member and cooperatively related to said member, said backing means being easily and substantially uniformly flexible in a single plane, and pressure applying means having different portions bearing upon said blade substantial distances inwardly of the ends thereof at longitudinally spaced points.

20. A surface wiper as defined in claim 19 including means connecting said portions to said blade for limited relative pivotal movement therebetween about an axis in said plane.

21. A surface wiper as defined in claim 19 wherein means connecting said portions to said blade engage said backing means to transmit pressure therethrough to said wiping member.

22. A surface wiper as defined in claim 19 wherein said different portions are connected to said blade by means maintaining said plane of flexure of said blade at all times substantially normal to said surface to be wiped, said elongated resilient member having a wiping edge spaced from and generally parallel to said backing means, a longitudinally extending portion of said resilient wiping member between said backing means and said wiping edge being of reduced thickness transversely of said plane whereby said resilient member may easily flex about a longitudinal axis in said plane irrespective of the degree or direction of curvature of said backing means in said plane.

23. A windshield wiper comprising, a blade having an elongated resilient wiping member capable of conforming to a surface to be wiped, an elongated unitary support member extending longitudinally of said wiping member and secured thereto, said support member being resiliently flexible in a single plane, said support member being substantially uniformly and sufficiently resiliently flexible to permit said blade to conform to a windshield surface under normal wiper arm pressure, yoke means having end portions engaging said blade at longitudinally spaced points, at least one of said points being substantial distances inwardly with relation to the ends of said blade, portions of said yoke means between said end portions being spaced from said blade.

24. A windshield wiper comprising, a blade having an elongated resilient wiping member capable of conforming to a surface to be wiped, elongated continuous support means extending longitudinally of said wiping member and secured thereto, said support means having a longitudinally extending portion substantially uniformly flexible throughout the length of said portion in a single plane, and an elongated yoke having end portions laterally offset from its longitudinal dimension in a direction toward the surface to be wiped and engaging said blade at longitudinally spaced points, at least one of said end portions engaging said blade substantially inwardly of the ends thereof the mid-portion of said support means being at least as readily flexible in said plane as the end portions thereof.

25. A windshield wiper assembly comprising, a blade having an elongated substantially uniformly resilient and flexible and linearly continuous wiping member, an elongated substantially uniformly resiliently flexible backing member connected to said wiping member and confining longitudinal flexure thereof substantially to a single plane, said backing member being substantially more resistant to flexure than said wiping member, and pressure-applying means arranged to receive pressure from a single source and having different portions engaging said blade at longitudinally spaced points substantial distances inwardly of the ends thereof.

26. In a windshield wiper blade assembly and in combination a subassembly constructed and arranged to conform readily to progressively varying contours of the surface of a windshield, whether a flat windshield or a convex or concave curved windshield, and a pressure-distributing superstructure constructed and arranged to receive operating pressure from a pressure-applying means and to transmit and distribute that pressure to said subassembly through a plurality of connections between said superstructure and said subassembly, said subassembly comprising a longitudinally disposed resilient wiping element and longitudinally disposed flexible stay means longitudinally supporting said element, said subassembly being freely and substantially uniformly flexible in a plane substantially perpendicular to said windshield and relatively inflexible in a plane transverse thereto, at least one of said connections being disposed with substantial portions of said subassembly extending longitudinally in opposite directions therefrom and defining a pivot upon which said portions may rock in said first-mentioned plane to facilitate equalization, throughout their length, of their respective pressures upon the windshield to promote their conformity therewith.

27. A windshield wiper assembly comprising, pressure-distributing means having mutually reactive spaced apart pressure-applying portions, a linearly continuous wiper blade substantially uniformly resiliently and freely flexible in a single plane, said blade being carried by said pressure-distributing means, said pressure-applying portions being constructed and arranged to apply pressure to a plurality of longitudinally spaced-apart points on said blade substantially remote from the ends thereof.

28. A windshield wiper assembly as defined in claim 27 wherein said pressure-applying means carries abutment means for engaging said wiper blade whereby to limit tilting of said blade relative to said pressure-applying means.

29. A windshield wiper assembly comprising, freely and substantially uniformly flexible resilient support means, a readily bendable resilient wiping element supported thereby, pressure-applying means engaging said support means at longitudinally spaced apart points thereon substantial distances inwardly from the ends thereof, and retaining means interlocked with said support means and engaging an external surface of said wiping element whereby to prevent accidental displacement of said blade with respect to said pressure-applying means said pressure-applying means having means thereon for attachment to a windshield wiper arm.

30. In a windshield wiper blade assembly, an elongated wiping member of readily bendable resilient material, an elongated stay member having a substantially uniform cross section throughout its operative length and being substantially uniformly reversely flexible in a plane substantially perpendicular to the surface to be wiped and being substantially inflexible in a plane at right angles to said first-mentioned plane, one of said members having a channel-like longitudinally disposed female portion and the other of said members having a longitudinally disposed male portion, said male and female portions being operatively disposed in embracing relationship with each other, substantial portions of said stay member being disposed exteriorly of the wiping member, and pressure-distributing means connected to said substantial portions and constructed and arranged to apply pressure thereto at longitudinally spaced points thereon.

31. A wiper blade having a resiliently flexible and linearly continuous wiping portion and a coextending substantially uniformly longitudinally flexible supporting portion relatively less flexible than said wiping portion, means for substantially constraining said supporting portion to flex in a plane generally perpendicular to a surface to be wiped, pressure-distributing means for urging said wiper blade to conform to such surface, said pressure-distributing means having spaced-apart portions bearing upon said wiper blade, at least one of said portions being disposed sufficient relative distances from the ends of said blade to permit substantial portions of said blade, extending longitudinally in opposite directions with relation to said one bearing portion, to pivot freely thereunder to facilitate equalization, throughout their respective lengths, of their respective pressures upon a surface to be wiped, to promote their conformity therewith.

JOHN W. ANDERSON.

REFERENCES CITED

The following references are of record in the file of this patent:

UNITED STATES PATENTS

| Number | Name | Date |
| --- | --- | --- |
| 608,140 | Case | July 26, 1898 |
| 1,463,590 | Pederson | July 31, 1923 |
| 1,694,245 | Baker et al. | Dec. 4, 1928 |
| 2,276,556 | Zaiger | Mar. 17, 1942 |
| 2,303,694 | Horton | Dec. 1, 1942 |

FOREIGN PATENTS

| Number | Country | Date |
| --- | --- | --- |
| 427,383 | Great Britain | Apr. 23, 1935 |
| 820,156 | France | July 26, 1937 |

Certificate of Correction

Patent No. 2,596,063

May 6, 1952

JOHN W. ANDERSON

It is hereby certified that error appears in the printed specification of the above numbered patent requiring correction as follows:

Column 9, line 65, and column 10, line 4, for "therefore" read *therefor*; column 14, list of references cited, under the heading "FOREIGN PATENTS" add the following—

689,339    Germany _____ Mar. 18, 1940 and that the said Letters Patent should be read as corrected above, so that the same may conform to the record of the case in the Patent Office.

Signed and sealed this 9th day of June, A. D. 1953.

[SEAL]

THOMAS F. MURPHY,
*Assistant Commissioner of Patents.*